United States Patent [19]

Scapes

[11] 4,118,007
[45] Oct. 3, 1978

[54] VALVE STRUCTURE

[75] Inventor: John N. Scapes, Schaumburg, Ill.

[73] Assignee: Gould Inc., Rolling Meadows, Ill.

[21] Appl. No.: 778,370

[22] Filed: Mar. 17, 1977

[51] Int. Cl.² .......................................... F16K 31/44
[52] U.S. Cl. .................................................. 251/223
[58] Field of Search ....................... 251/223, 225, 284; 151/57, 54

[56] References Cited

U.S. PATENT DOCUMENTS

| | | | |
|---|---|---|---|
| 829,485 | 8/1906 | O'Meara | 151/57 |
| 1,313,589 | 8/1919 | Eaton | 151/57 |
| 2,203,219 | 6/1940 | Jackman, Jr. | 151/57 |
| 2,958,504 | 11/1960 | Lindgren | 251/223 |

Primary Examiner—Martin P. Schwadron
Assistant Examiner—A. Michael Chambers
Attorney, Agent, or Firm—Wegner, Stellman, McCord, Wiles & Wood

[57] ABSTRACT

A valve structure having a body provided with a threaded recess for receiving a bonnet provided with a chordal flatted tool engaging portion received in an outer portion of the recess when the member is threadedly installed on the body. The outer end of the recess may be radially enlarged to receive a retainer which, when installed therein, extends between the flatted surface of the member and the body to effectively positively prevent further rotation of the member in the body threaded recess, thereby locking the member in the mounted disposition. The retainer may extend outwardly from the body surface portion and may include an outer portion engaging an outer portion of the flatted surface. The retainer may be defined by a pin having an inner end received in a hole provided in the body radially outwardly of the recess.

11 Claims, 3 Drawing Figures

U.S. Patent  Oct. 3, 1978  4,118,007
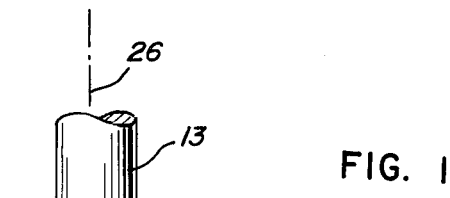
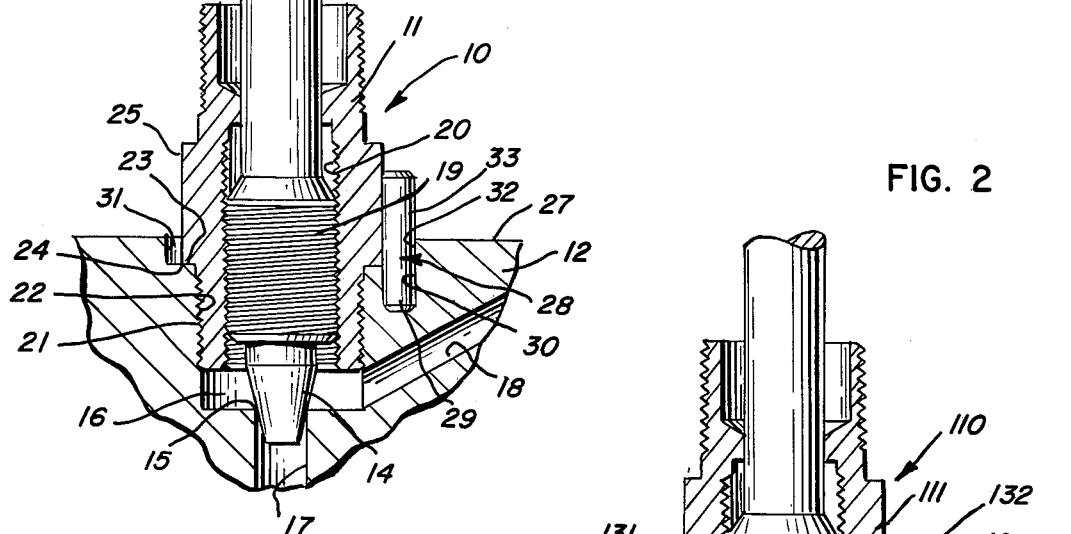
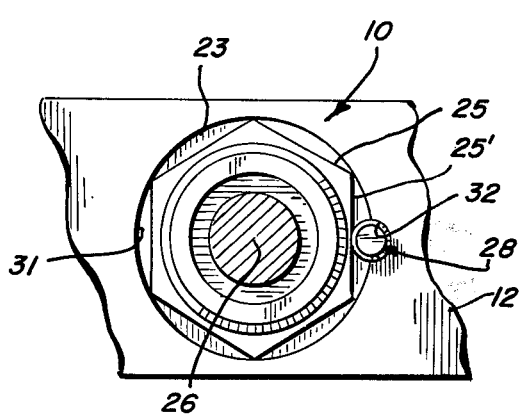
FIG. 1
FIG. 2
FIG. 3

VALVE STRUCTURE

BACKGROUND OF THE INVENTION

1. Field of the Invention

This invention relates to valve structures and in particular to means for effectively locking a threaded valve portion to a complementary valve portion.

2. Description of the Prior Art

In one conventional form of valve, a bonnet is threadedly installed on a body portion of the valve and adjustably carries a valve stem provided at its inner end with a movable valve member adapted to have selective seating engagement with a valve seat in the body. The valve seat opens to a valve chamber. One port of the valve may open to the valve chamber and another port may open through the valve seat to the chamber so that the movable valve member effectively defines means for controlling fluid flow through the valve between the ports.

It is desirable to prevent further threaded rotation between the valve portions when they are threaded to the desired assembled relationship. It has been conventional to provide some form of locking pin installed in one portion of the valve so as to have interference with the relatively rotatable second portion, thereby preventing such undesirable further threaded rotation. A substantial number of different forms of locking pin arrangements have been developed, such as for locking nuts or bolts against rotation relative to the complementary element. Thus, illustratively, Andrew J. Gunn shows, in U.S. Pat. No. 405,773, a nut lock wherein a pin is received in a notch in one edge of a locking plate associated with the nut.

In U.S. Pat. No. 875,919, George F. Robertson shows a nut lock which is defined by an angled end portion of a link member having a turned portion so as to engage the nut in a recess within the member to which the link is pivotally connected.

Floyd W. Newman, in U.S. Pat. No. 861,139, shows a nut lock wherein the relatively rotatable elements are provided with longitudinal slots receiving a turned member which is snapped into one of the recesses to complete the locking. The locking element comprises a section of resilient wire to provide the desired snapping action.

Frederick J. Brown, in U.S. Pat. No. 930,148, shows another form of nut lock wherein a pin is extended through a hole in a flange portion of the nut with an inner end of the pin received in a hole in the mounting member.

In U.S. Pat. No. 1,470,386, Henry Miller shows a screw lock comprising a pin having oppositely turned ends carried by the slot of a fillister head screw with the ends being received in an outer recess so as to engage the walls of the mounting member in the recess. The arrangement causes the tips of the turned ends to bite into the sidewalls of the recess so as to resist reverse rotation of the screw while permitting further forward rotation.

James H. C. Boyd, in U.S. Pat. No. 1,799,950, shows a locking member having a flange provided with a plurality of radially outwardly opening notches adapted to receive the head of a locking screw spaced outwardly of the mounting member.

Arthur E. Jackman, Jr. shows, in U.S. Pat. No. 2,203,219, a cap bolt lock wherein a locking pin is driven into the mounting member in an undercut groove of a counterbore thereof to register with a peripheral groove of the screw head with a portion of the pin flowing into an annular groove in the screw head to prevent endwise movement of the screw head.

In U.S. Pat. No. 2,428,341 of Louis W. Schaaff, a locking means is shown to comprise a ring-type friction lock for securing parts against relative rotation wherein enlarged ends of the ring cause a spreading of the ring into tighter frictional engagement with the recess wall as a result of an attempted turning of the screw relative to the mounting member.

Einar Medal, in U.S. Pat. No. 3,295,579, shows a lock bolt wherein a pin is extended through mating holes in the head of the bolt and the mounting member.

Leslie Parkin, in U.S. Pat. No. 3,451,455, shows a fastener for anchoring a nut formed of a hollow body having sidewalls provided with integral resilient tongues displaced laterally by the nut as it is drawn axially into the body so that the pointed ends of the tongues are driven into the sides of the recess in which the hollow body is mounted.

SUMMARY OF THE INVENTION

The present invention comprehends an improved valve structure having an improved means for preventing undesirable threaded rotation of one valve portion threadedly mounted to another valve portion when the two portions are arranged in an assembled relationship.

More specifically, the invention comprehends an improved structure wherein the valve body is provided with a surface portion and a recess having a female thread opening outwardly toward the surface portion. A bonnet is provided with a male threaded inner end threaded to the female thread in the body recess and is provided with an outer tool engaging portion. In the illustrated embodiment, the tool engaging portion comprises a chordal flatted surface on the bonnet.

The bonnet may be arranged to carry a movable valve member, such as a needle valve, at the inner end of a stem threadedly mounted to the bonnet, for cooperation with a valve seat in the valve body for controlling fluid flow through the valve.

The means for locking the bonnet in the threaded mounted disposition on the body may comprise an annular radially enlarged outer end of the recess opening through the surface portion from which the bonnet extends. At least a portion of the tool engaging portion of the bonnet is disposed within the outer end of the recess and a retainer is installed therein to extend fully between the bonnet tool engaging surface and the body at the periphery of the enlarged outer end of the recess.

In the illustrated embodiment, the tool engaging surface may comprise any one of a plurality of polygonally arranged flatted chordal surfaces on the bonnet.

In the illustrated embodiment, the recess defines a radially outwardly extending notch for receiving a radially outer portion of the retainer.

In the illustrated embodiment, the retainer comprises a pin having an inner end mounted to the body in a hole spaced radially outwardly of the threaded recess.

The notch may comprise a semicylindrical notch receiving the outer semicylindrical portion of the pin.

In the illustrated embodiment, the enlarged annular recess portion may have a diameter substantially equal to the largest cross-sectional dimension of the tool engaging, or turning, portion of the bonnet so that the bonnet may be freely threadedly rotatable into the desired mounting disposition while yet providing a clearance space between the chordal flatted surface and the periphery of the recess to receive at least a portion of the retainer.

In the illustrated embodiment, the notch opens into the recess so that a portion of the retainer is disposed in the annular recess and a portion thereof is disposed in the notch portion of the recess.

The locking means of the present invention is extremely simple and economical of construction while yet providing a highly improved valve structure as discussed above.

BRIEF DESCRIPTION OF THE DRAWING

Other features and advantages of the invention will be apparent from the following description taken in connection with the accompanying drawing wherein:

FIG. 1 is a fragmentary vertical section of a valve structure embodying the invention;

FIG. 2 is a fragementary vertical section of a modified form of valve structure embodying the invention; and FIG. 3 is a top plan view of the embodiments of either FIGS. 1 or 2.

DESCRIPTION OF THE PREFERRED EMBODIMENTS

In the exemplary embodiment of the invention as disclosed in FIGS. 1 and 3 of the drawing, a valve structure generally designated 10 illustratively comprises a needle valve having a bonnet 11 threadedly connected to a body 12 and adjustably carrying a stem 13 provided at its inner end with a movable valve element 14 for selective engagement with a valve seat 15 defined by the body 12.

In the illustrated embodiment, the body defines a valve chamber 16 with one body port 17 opening through the valve seat 15 into the chamber and a second body port 18 opening to one side of the chamber whereby movable valve element 14 may selectively control fluid flow through the valve between the ports.

Longitudinal adjustment of the movable valve element 14 may be effected by suitable means which, in the illustrated embodiment, comprises a threaded portion 19 on the stem 13 co-operating with a complementary female threaded surface 20 of the bonnet. Conventionally, a handle (not shown) may be provided on the outer end of the stem for effecting the desired threaded rotation of the stem for selective engagement of the valve element 14 with the valve seat 15. As will be obvious to those skilled in the art, however, the particular means for effecting the desired selective seating of the element 14 with the valve seat forms no part of the present invention.

The present invention is concerned with the problem of maintaining the bonnet in mounted association with the body and, more particularly, with the problem of maintaining the bonnet against rotation therein. Thus, as shown in FIG. 1, the bonnet may be provided with a male threaded inner end portion 21 received in a complementary female threaded recess portion 22 in the body 12 opening to valve chamber 16. The body may define a shoulder 23 against which a complementary shoulder 24 on the socket seats when the valve is fully installed on the body.

As indicated briefly above, it has been common in connection with such bonnet-type valves to lock the bonnet against rotation relative to the body by installing a pin in the body to abut the bonnet after the bonnet is installed in the mounted disposition. More specifically, it has been conventional in such bonnets to provide a plurality of flatted surfaces 25 arranged in a polygonal array about the axis 26 of the valve. More specifically, it has been conventional to provide a hexagonal array of such flatted surfaces for engagement by a tool, such as a wrench. It has further been conventional to install the locking pin in an outer surface portion 27 of the body to abut a selected one of the flatted surfaces 25 thereby to lock the bonnet against further rotation. However, it has been found that such a pin does not fully effectively lock the bonnet as the pin may be deformed outwardly away from the bonnet by a forceful rotation thereof. The present invention provides a novel arrangement of the locking means effectively precluding such undesirable threaded rotation of the bonnet once it is locked in place on the body.

More specifically, as shown in FIG. 1, the present invention comprehends the provision of a locking element comprising a pin 28 having an inner end 29 retained within a hole 30 opening outwardly through shoulder 23. Recess 22 includes an enlarged annular outer portion 31 outwardly of shoulder 23 and provided with a semicylindrical notch 32 opening radially inwardly and defining an outward continuation of hole 30.

In the illustrated embodiment, the diameter of the annular recess 31 is substantially equal to the maximum transverse cross section of the turning portion of the bonnet defined by polygonal array of flatted surfaces 25 to permit free turning of the bonnet to the installed disposition of FIG. 1 with the lower portion of the flatted surfaces being disposed within the recess.

Upon completion of the threaded installation of the bonnet in the body, pin 28 may be installed by longitudinal movement thereof downwardly along one flatted surface, such as flatted surface 25' shown in FIG. 3, confronting the notch 32 so as to pass the lower end 29 of the pin through the notch and downwardly into hole 30 to secure the pin in locking relationship to the bonnet. As shown in FIG. 3, notch 32 and pin 28 may have substantially similar diameters whereby a semicylindrical outer portion of the pin is received in the semicylindrical notch 32 so as to effectively capture the pin between the bonnet surface 25' and the wall of body 12.

As further shown in FIG. 1, an outer end 33 of the pin 28 projects outwardly from the body surface portion 27 for facilitated installation and removal when desired. The portion of pin 28 disposed in the notch portion 32 of recess 31 is effectively positively backed up by the body so as to effectively positively prevent rotation of the bonnet by the interference of the pin with the flatted surface 25'. Thus, while the outer portion 33 of the pin functions additionally to provide a restraining action against rotation of the bonnet relative to the body, the positive prevention of the rotation by the portion of the pin within notch 32 permits the outer portion 33 to effectively serve primarily as a means for facilitating such installation and removal.

Where it is desired to permanently lock the bonnet to the body, a modified form of locking pin, such as locking pin 128 shown in FIG. 2, may be utilized to provide a modified form of valve structure generally designated 110 wherein the bonnet 111 is locked to the body 112 by the pin 128 received in a notch portion 131 of an outer enlarged recess 132 of an outer enlarged recess 130 of the body. Thus, pin 128 functions similarly to pin 27 but is effectively arranged to define a permanently installed pin structure for use as where it is desired to maintain the bonnet permanently in association with the body.

While in the illustrated embodiment the pin 28 is retained to the body by its fit within the hole 30, as will be obvious to those skilled in the art, any suitable securing means may be utilized, including threaded connecting means, friction welding means, etc.

The valve structure of the present invention providing the improved bonnet locking means as described above is extremely simple and economical of construction while yet providing the highly desirable positive locking functioning discussed above.

The foregoing disclosure of specific embodiments is illustrative of the broad inventive concepts comprehended by the invention.

I claim:

1. In a valve having a body provided with a surface portion and a recess having a female thread and opening outwardly toward said surface portion, a bonnet having a male threaded inner end threaded to said female thread in said recess, and an outer tool engaging portion having a chordal flatted surface, and cooperating valve means carried by said body and bonnet for selectively controlling fluid flow through the valve, the improvement comprising:

means defining an annular, radially enlarged outer end of said recess opening through said surface portion, at least a portion of said flatted surface of the bonnet being disposed within said outer end of the recess; and a retainer installed in said enlarged outer end of the recess with said bonnet threadedly mounted to the body, said retainer being secured to said body and extending fully between said flatted surface and the body at the periphery of said annular outer end of the recess, whereby said body effectively backs up the retainer against radial displacement by the bonnet to effectively positively prevent further rotation of the bonnet in said recess thread thereby firmly locking the bonnet in the mounted disposition.

2. The valve of claim 1 wherein said retainer includes an outer portion projecting outwardly from said enlarged outer end of the recess.

3. The valve of claim 1 wherein said bonnet tool engaging flatted surface extends outwardly from said enlarged end of the recess with the bonnet mounted to said body, and said retainer includes an outer portion projecting outwardly from said outer end of the recess and abutting said flatted surface outwardly of the recess.

4. The valve of claim 1 wherein said enlarged outer end of the recess defines a laterally outwardly extending notch, said retainer including a portion received in said notch.

5. The valve of claim 1 wherein said retainer comprises a cylindrical element.

6. The valve of claim 1 wherein said enlarged outer end of the recess defines a laterally outwardly extending semicylindrical notch, said retainer including a portion received in said notch.

7. The valve of claim 1 wherein said retainer comprises a cylindrical element and said enlarged outer end of the recess defines a semicylindrical laterally outwardly extending notch receiving an outer semicylindrical portion of said cylindrical element.

8. The valve of claim 1 wherein said tool engaging portion of the bonnet further defines a plurality of additional flatted chordal surfaces arranged seriatim about the longitudinal axis of the bonnet for selective engagement by said retainer in the mounted disposition of the bonnet relative to the valve body.

9. The valve structure of claim 8 wherein said flat chordal recesses are arranged in a polygonal array.

10. The valve structure of claim 1 wherein said outer end of the recess has a diameter substantially equal to the largest cross-sectional dimension of said outer tool engaging portion.

11. The valve structure of claim 1 wherein said retainer includes an inner end mounted in an outwardly opening hole in the body laterally outwardly of said recess female thread.

* * * * *